United States Patent
Levin et al.

(10) Patent No.: US 10,458,682 B2
(45) Date of Patent: Oct. 29, 2019

(54) AIR-CONDITIONING SYSTEM (71) Applicant: Ford Global Technologies, LLC, Dearborn, MI (US)

(72) Inventors: Michael Levin, Ann Arbor, MI (US); Furqan Zafar Shaikh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/868,242

(22) Filed: Jan. 11, 2018

(65) Prior Publication Data
US 2019/0113259 A1 Apr. 18, 2019

Related U.S. Application Data (60) Provisional application No. 62/573,428, filed on Oct. 17, 2017.

(51) Int. Cl.
*F25B 17/08* (2006.01)
*B60H 1/00* (2006.01)

(52) U.S. Cl.
CPC .................. *F25B 17/086* (2013.01)

(58) Field of Classification Search
CPC ... F25B 17/086; B60H 1/00492; B60H 1/025; B60H 1/3208; B60H 1/323
See application file for complete search history.

(56) References Cited

U.S. PATENT DOCUMENTS

| | | | |
|---|---|---|---|
| 6,059,016 A * | 5/2000 | Rafalovich | B60H 1/00492 165/10 |
| 6,419,389 B1 * | 7/2002 | Fuchs | F28D 20/02 378/130 |
| 8,511,111 B2 | 8/2013 | Lambert et al. | |
| 8,661,800 B2 | 3/2014 | Levin et al. | |
| 8,707,729 B2 | 4/2014 | Schmidt et al. | |
| 9,080,796 B2 | 7/2015 | Shaikh et al. | |
| 2004/0211182 A1 * | 10/2004 | Gould | F01K 13/00 60/643 |
| 2009/0205590 A1 * | 8/2009 | Vetrovec | F01P 11/20 123/41.14 |
| 2012/0227926 A1 * | 9/2012 | Field | F24D 11/003 165/10 |
| 2014/0047853 A1 * | 2/2014 | Zhong | B60H 1/3201 62/106 |
| 2014/0053579 A1 * | 2/2014 | Shaikh | F25B 27/00 62/79 |
| 2014/0064010 A1 * | 3/2014 | Barkley | G11C 5/14 365/226 |
| 2015/0273974 A1 * | 10/2015 | Levin | B60H 1/005 62/101 |
| 2016/0003502 A1 * | 1/2016 | Zelissen | F25B 21/02 136/205 |
| 2016/0290216 A1 * | 10/2016 | Katragadda | F01P 11/16 |

(Continued)

*Primary Examiner* — Kun Kai Ma
(74) *Attorney, Agent, or Firm* — Vichit Chea; Price Heneveld LLP (57) ABSTRACT

An air-conditioning system includes first and second PCM vessels, a heat recovery circuit, and a conduit and valve system. The heat recover circuit includes a third PCM vessel. The conduit and valve system operably couples i.) a first heat exchanger to the first PCM vessel and a radiator, ii.) a second heat exchanger to a core and the second PCM vessel, and iii.) the heat recovery circuit to the first heat exchanger.

20 Claims, 4 Drawing Sheets

(56) References Cited

U.S. PATENT DOCUMENTS

| | | | |
|---|---|---|---|
| 2016/0297281 A1* | 10/2016 | Levin | B60H 1/3201 |
| 2017/0120725 A1 | 5/2017 | Zhou et al. | |
| 2017/0307263 A1* | 10/2017 | Ma | F28D 20/02 |
| 2018/0087831 A1* | 3/2018 | Chou | F25D 31/006 |
| 2018/0114998 A1* | 4/2018 | Kwon | H01M 8/04029 |

* cited by examiner

AIR-CONDITIONING SYSTEM

CROSS-REFERENCE TO RELATED APPLICATION

This application claims priority to and the benefit under 35 U.S.C. § 119(e) of the U.S. Provisional Patent Application No. 62/573,428 filed Oct. 17, 2017, entitled AIR-CONDITIONING SYSTEM, the entire disclosure of which is incorporated herein.

FIELD OF THE DISCLOSURE

The present disclosure generally relates to an air-conditioning system. More specifically, the present disclosure relates to an air-conditioning system for a vehicle.

BACKGROUND OF THE INVENTION

Air-conditioning systems are utilized by consumers in many situations to cool their environment. One such situation where consumers often desire the ability to cool their environment is when utilizing a vehicle. Vehicles can become uncomfortably hot in warm weather, particularly when the vehicle sits in the sun for extended periods of time. Conventional air-conditioning systems often have a time lag between when the consumer requests cool air and when the vehicle is able to provide noticeably cooler air. Additionally, conventional air-conditioning systems often utilize a belt-driven compressor that can provide additional load to an engine of the vehicle such that the fuel efficiency is negatively impacted. Accordingly, there is a need for improved air-conditioning systems that avoid the negative impact on the fuel efficiency of the vehicle while simultaneously decreasing the time lag between when the consumer requests cool air and when the vehicle is able to provide noticeably cooler air.

SUMMARY OF THE INVENTION

According to a first aspect of the present disclosure, an air-conditioning system includes first and second PCM vessels, a heat recovery circuit, and a conduit and valve system. The heat recover circuit includes a third PCM vessel. The conduit and valve system operably couples i.) a first heat exchanger to the first PCM vessel and a radiator, ii.) a second heat exchanger to a core and the second PCM vessel, and iii.) the heat recovery circuit to the first heat exchanger.

Embodiments of the first aspect of the present disclosure can include any one or a combination of the following features:

the first heat exchanger and the second heat exchanger are housed within a vacuum enclosure;

the first heat exchanger includes an adsorption bed for adsorbing a vapor of a refrigerant and a first heat exchange conduit that circulates a first heat exchange fluid through the adsorption bed during a first mode of operation;

the adsorption bed includes a plurality of plates that are coated with a desiccant;

the first heat exchange conduit includes an inlet end with a first valve and an outlet end with a second valve;

the second heat exchanger includes a refrigerant evaporator/condenser and a second heat exchange conduit that circulates a second heat exchange fluid through the evaporator/condenser during a first mode of operation;

the second heat exchange conduit includes an inlet with a third valve and an outlet with a fourth valve;

the conduit and valve system includes a fifth valve upstream of the core and a sixth valve downstream of the second PCM vessel;

the air-conditioning system further includes a first pump positioned between the radiator and the vacuum enclosure and a second pump positioned between the fifth valve and the core;

the air-conditioning system further includes a seventh valve downstream of the first PCM vessel and upstream of the radiator and an eighth valve downstream of the first PCM vessel, downstream of the radiator, and upstream of the first pump;

the first heat exchange fluid bypasses the radiator by being directed through the first PCM vessel by the seventh and eighth valves until the first PCM vessel is filled, wherein when the first PCM vessel is filled, the first heat exchange fluid is directed through the radiator by the seventh and eighth valves;

the air-conditioning system is installed in a vehicle;

the heat recovery circuit further includes a heat source, a third pump, and a third heat exchange fluid that is circulated through the heat source to capture heat; and the conduit and valve system circulates the third heat exchange fluid from the heat recovery circuit through the first heat exchange conduit during a second mode of operation such that the refrigerant is heated and induces desorption at the adsorption bed.

According to a second aspect of the present disclosure, an air-conditioning system includes first and second PCM vessels, a heat recovery circuit, and a conduit and valve system. The heat recovery circuit includes a third PCM vessel that is configured to store heat. The conduit and valve system operably couples a first heat exchanger to the first PCM vessel and a radiator, wherein a first heat exchange fluid is cooled by at least one of the first PCM vessel and the radiator, ii.) a second heat exchanger to a core and the second PCM vessel, which together are configured to cool a second heat exchange fluid such that the core provides cooled air, and iii.) the heat recovery circuit to the first heat exchanger.

According to a third aspect of the present disclosure, a method of operating an air-conditioning system includes the steps of circulating a first heat exchange fluid through a first heat exchanger and a first PCM vessel during a first mode of operation; circulating a second heat exchange fluid through a second heat exchanger, a core, and a second PCM vessel during the first mode of operation; circulating the first heat exchange fluid through the first PCM vessel during a second mode of operation; and circulating a third heat exchange fluid through a heat recovery circuit that includes a third PCM vessel during the second mode of operation.

Embodiments of the third aspect of the present disclosure can include any one or a combination of the following features:

the step of circulating a first heat exchange fluid through a first heat exchanger and a first PCM vessel during a first mode of operation further includes the step of circulating the first heat exchange fluid through a radiator once the first PCM vessel has been filled;

the step of circulating the first heat exchange fluid through the first PCM vessel during a second mode of operation further includes the step of circulating the first heat exchange fluid through a radiator once the first PCM vessel has been filled;

the method of operating an air-conditioning system further includes the step of circulating air to be conditioned through the core during the first mode of operation and the second mode of operation; and the method of operating an air-conditioning system further includes the step of circulating the third heat exchange fluid from the heat recovery circuit through the first heat exchanger during the second mode such that the first heat exchanger and the second heat exchanger are regenerated.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
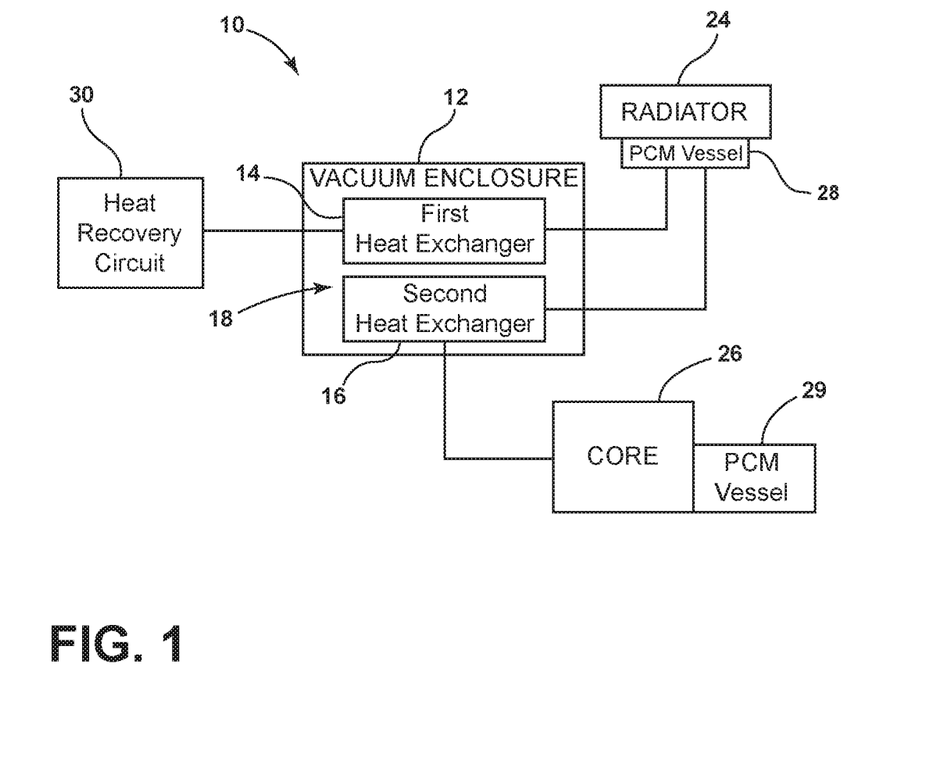
FIG. 1 is a schematic block diagram of an air-conditioning system.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an air-conditioning system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference is now made to FIG. 1, which schematically illustrates the air-conditioning system 10 that is the subject matter of this document. The air-conditioning system 10 includes a vacuum enclosure 12, a first heat exchanger 14, a second heat exchanger 16 and a refrigerant 18. The first heat exchanger 14, the second heat exchanger 16, and the refrigerant 18 are all held in the vacuum enclosure 12.

More specifically, the first heat exchanger 14 includes an adsorption bed for adsorbing and storing refrigerant vapor. That first heat exchanger 14 may include, for example, a plurality of plates 22, which may be coated with a desiccant (see FIGS. 2 and 3). The desiccant type may be a zeolite or a metal organic framework (MOF). Of course, other desiccant types appropriate for this purpose could be used if desired.

The second heat exchanger 16 includes a refrigerant evaporator/condenser which functions as a liquid refrigerant storage device and depending upon the enclosure pressure and temperature, condenses vapor or evaporates liquid. As will be apparent from the following description, the refrigerant 18 goes back and forth as a vapor and a liquid between the first heat exchanger 14 and the second heat exchanger 16. In some examples, the first and second heat exchangers 14, 16 in the vacuum enclosure 12 are not separated by any partition wall in order to minimize resistance to vapor flow. However, in some alternative examples, a thermal partition, such as a membrane, is provided within the vacuum enclosure 12 that separates the first heat exchanger 14 from the second heat exchanger 16. In examples that provide the thermal partition, the membrane may allow for vapor flow between the first and second heat exchangers 14, 16 while preventing heat transfer from a first side of the membrane to a second side of the membrane. In one possible embodiment, the refrigerant 18 is water which has a high latent heat of evaporation. However, it should be appreciated that other refrigerants could also be used. For example, other refrigerants include, but are not limited to, ammonia, methanol-water mixtures, and/or commonly used automotive refrigerants (e.g., R1234yf).

As further illustrated in FIG. 1, the air-conditioning system 10 includes a radiator 24 that effectively replaces the condenser in a conventional vehicle air-conditioning system and a core 26 that effectively replaces the evaporator in a conventional vehicle air-conditioning system. The core 26 may be positioned within an HVAC system of a vehicle (e.g., within ductwork of the HVAC system). A first phase change material (PCM) vessel 28 is provided upstream of the radiator 24. The first PCM vessel 28 may be equipped with a plurality of phase change materials that provide a plurality of phase changes within a temperature range from about 25° C. to about 45° C. to correspond with the variety of ambient level heat that may be present when the air-conditioning system 10 is used. The first PCM vessel 28 may be insulated with a dual-wall vacuum-gap type insulation. Alternatively, or in addition, the first PCM vessel 28 may be wrapped with vacuum insulation panel (VIP) material. As further illustrated, a second phase change material (PCM) vessel 29 is provided downstream from the core 26. The second PCM vessel 29 may be equipped with one or more phase change materials that provide one or more phase changes in a temperature range from about 5° C. to about 8° C. such that cool air may be provided when the air-conditioning system 10 enters a regeneration mode. The air-conditioning system 10 includes a heat recovery circuit 30 that will be described in greater detail below. The heat recovery circuit 30 may recover heat from an exhaust system of a vehicle, from traction motors of the vehicle, from a cooling jacket of an engine (e.g., the fluid circulated through an engine cooling system), dedicated heaters, from a cooling jacket of electric motors or heaters, a combination thereof, and/or any suitable heat source that produces sufficient heat and is present on or in the vehicle.

The air-conditioning system 10 may cycle between two modes of operation. In the first or adsorption/evaporation (AE) mode of operation illustrated in FIG. 2, the first heat exchange fluid is circulated by a first pump 23 from either the radiator 24 or the first PCM vessel 28, where it is cooled, through a first heat exchange conduit 32 in thermal communication with the first heat exchanger 14, thereby cooling the first heat exchanger 14 to remove the heat of adsorption (note action arrows A). The first PCM vessel 28 may bypass the radiator 24, as shown by action arrows K, from the first PCM vessel 28 to the first pump 23. The first PCM vessel 28 cools the first heat exchange fluid that is circulated by the first pump 23. In some embodiments, when the first PCM vessel 28 is "filled" by reaching its capacity for absorbing heat from the first heat exchange fluid, then the first PCM vessel 28 is bypassed, or flowed-through, such that the radiator 24 cools the first heat exchange fluid. The first heat exchange fluid may remain in thermal communication with the filled (i.e., melted) first PCM vessel 28 as the first heat exchange fluid moves to the radiator 24 without a risk of damaging the first PCM vessel 28. In some examples, the temperature difference ($\Delta T$) between the filled first PCM vessel 28 and the circulating first heat exchange fluid may be less than about 50° C., less than about 30° C., less than about 10° C., and/or combinations and ranges thereof. The filled first PCM vessel 28 may remain free of risk of overheating by the heated first heat exchange fluid up to a $\Delta T$ of about 100° C. When the vehicle is parked, for example at the end of the day, the first PCM begins to cool and eventually may re-freeze and be ready to be utilized again. In some embodiments, the first PCM vessel 28 may be sufficiently insulated to store the phase change material in a melted state for the "next start" of the vehicle and may utilize the stored heat as a way to heat the vehicle. The cooling of the first heat exchanger 14 reduces the absolute pressure inside the vacuum enclosure 12 to a range from about 0.5-1.0 kPa. The reduction in the absolute pressure inside the vacuum enclosure 12 enables the plates 22, which are coated with a desiccant, of the first heat exchanger 14 to draw and store refrigerant vapor.

Figure 2:
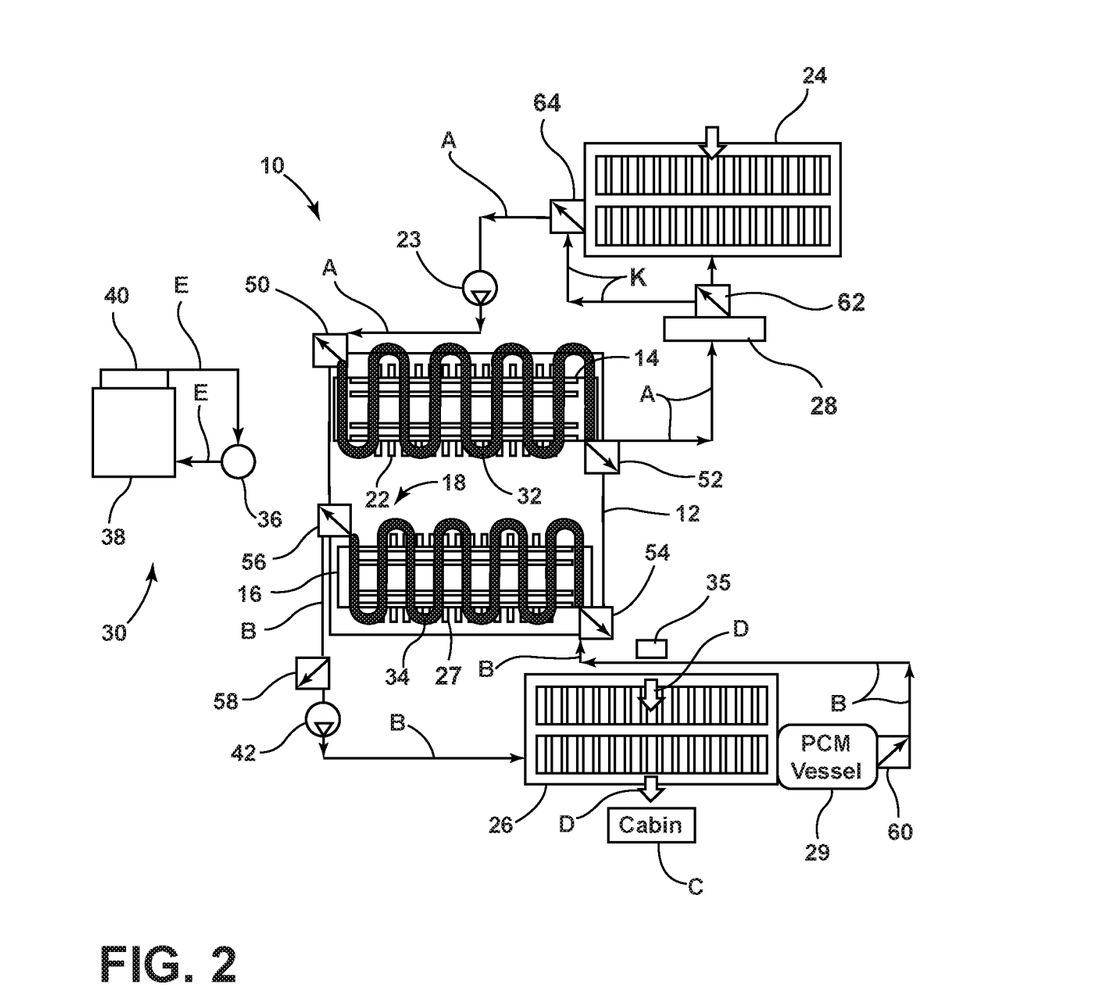
FIG. 2 is a schematic block diagram of the air-conditioning system illustrating an adsorption mode of operation.

In embodiments where the refrigerant 18 is a liquid, the reduction of the pressure inside the vacuum enclosure 12 to the saturation pressure level of the refrigerant 18 and the vapor suctioned by the first heat exchanger 14 produce intense evaporation (boiling) of the film of refrigerant 18 on the surfaces of plates 27 of the second heat exchanger 16. The refrigerant vapor generated in the vacuum enclosure 12 is transported to, and stored on, the plates 22.

During the AE mode of operation, a second heat exchange fluid is circulated by a third pump 42. The second heat exchange fluid circulates through a second heat exchange conduit 34 of the second heat exchanger 16, the core 26, and the second PCM vessel 29 (note action arrows B). As a result, the core 26 is cooled to a temperature range of about 5°-7° C. for heat exchange with air being circulated through a passenger cabin C of a motor vehicle by a blower 35 (note action arrows D). The blower 35 may be a fan, such as an HVAC fan. As a result, the air is cooled and dehumidified. The second heat exchange fluid is then circulated to the second PCM vessel 29 where it serves to freeze the phase change material in the second PCM vessel 29. The second PCM vessel 29 may, for example, be made of a shell-and-tube construction with the phase change material filling the tubes and the refrigerant flowing on the shell side. The heat insulation could be of a dual-wall vacuum-gap type. Alternatively, or in addition, the second PCM vessel 29 could be wrapped with vacuum insulation panel (VIP) material. The second PCM vessel 29 would typically contain 2-4 kg of phase change material with the latent heat in the 150-350 kJ/kg range and a melting point in a temperature range from about 4° C. to about 10° C., about 6° C. to about 8° C., and/or combinations thereof.

In the illustrated embodiment, the second PCM vessel 29 is located downstream of the core 26. It should be appreciated that the second PCM vessel 29 could, alternatively, be located upstream of the core 26 depending upon particular thermal management requirements. In some embodiments, the core 26 and the second PCM vessel 29 may be plumbed such that the second PCM vessel 29 may be selectively made upstream or downstream of the core 26, for example, by providing a humidity sensor that is referenced to decide whether to utilize the second. PCM vessel 29 in the upstream or downstream configuration relative to the core 26. The choice of having the second PCM vessel 29 upstream or downstream of the core 26 may be beneficial since vehicles are often sold and driven in various climates. It may be beneficial to have the second PCM vessel 29 upstream of the core 26 in dry climates while it may be beneficial to have the second PCM vessel 29 downstream of the core 26 in humid climates. When placed upstream, less or no reheating of air may be required, as the heat exchange fluid entering the core 26 would be warmer having received some heat from the phase change material. Additionally, the phase change material may store the thermal energy quicker when the second PCM vessel 29 is placed upstream of the core 26 as the phase change material would freeze faster. However, in humid climates, delaying the freezing of the phase change material may be preferable.

In winter or at other appropriate times, the air coming from the core 26 could be directed to a separate heater core (not shown) before the air enters the cabin in order to raise the air temperature to the level of comfort desired by the occupants.

The core 26 may be constructed similar to automotive heater cores commonly used for cabin heating. The blower 35 forces air through the core 26 in thermal communication with the circulating second heat exchange fluid and then into the cabin C of the vehicle to provide cooling for the vehicle occupants.

During the AE mode of operation, a second pump 36 circulates the third heat exchange fluid in the heat recovery circuit 30, which may be a closed loop, between a heat source, such as an exhaust gas heat exchanger 38, and a third phase change material (PCM) vessel 40 in order to store heat in the phase change material held in the third PCM vessel 40 (note action arrows E). While the exhaust gas heat exchanger 38 is described as utilizing the exhaust system of a vehicle as the source of heat, it is contemplated that alternative heat sources may be used. The third PCM vessel 40 may be equipped with a phase change material that melts in a temperature range of about 60° C. to about 100° C. For example, the melting point of the phase change material in the third PCM vessel 40 may be in the range of about 60° C. to about 80° C., such as 70° C. The heat insulation utilized in the third PCM vessel may be of a dual-wall vacuum-gap type. Alternatively, or in addition, the third PCM vessel 40 may be wrapped with vacuum insulation panel (VIP) material. The third PCM vessel 40 may be utilized as a heat source for a second or desorption/condensation (DC) mode.

Figure 3:
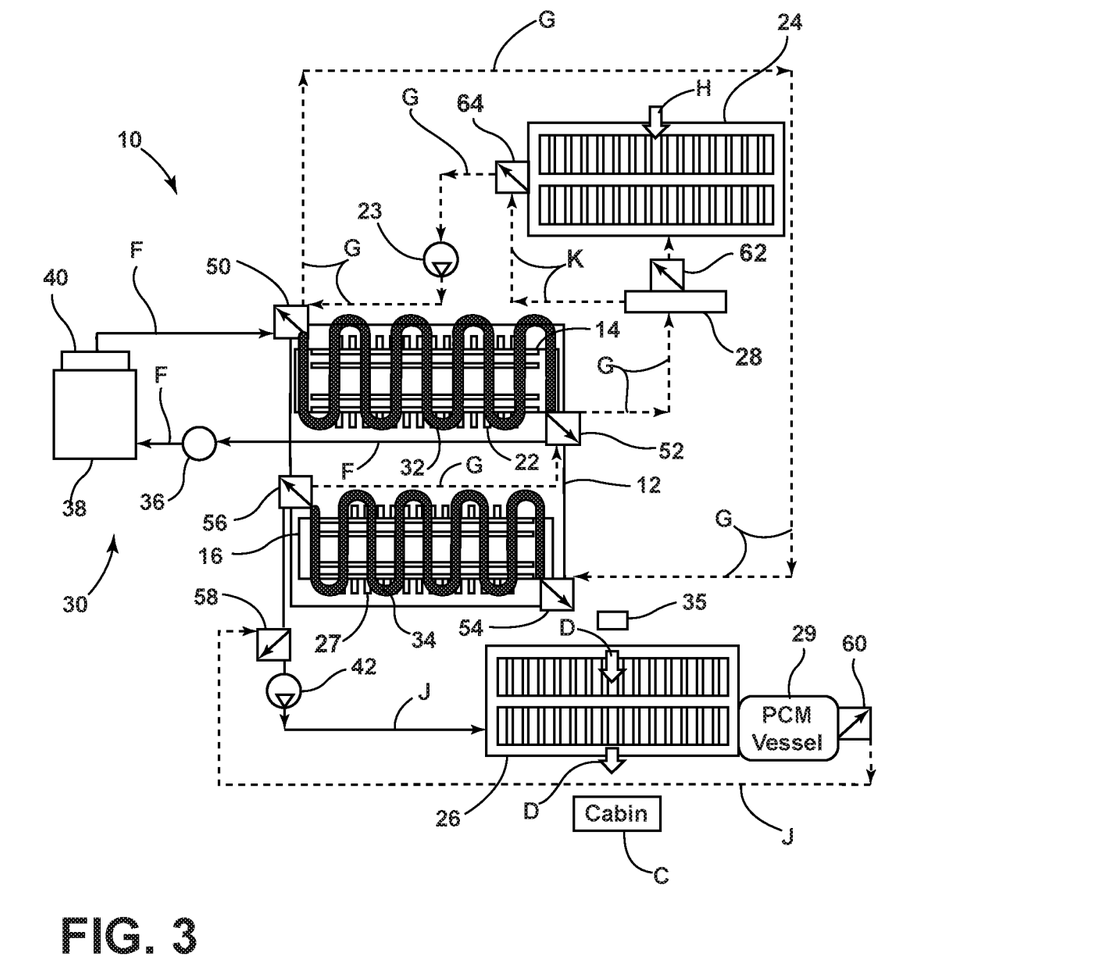
FIG. 3 is a schematic block diagram of the air-conditioning system illustrating a desorption mode of operation.

In the second or desorption/condensation (DC) mode of operation illustrated in FIG. 3, the heated third heat exchange fluid is circulated between the first heat exchange conduit 32 of the first heat exchanger 14 and the heat recovery circuit 30 (see action arrows F). The heat from the third exchange fluid causes the absolute pressure in the vacuum enclosure 12 to rise to within a range from about 10 kPa to about 14 kPa. The increase in the absolute pressure in the vacuum enclosure 12 causes the first heat exchanger 14 to expel refrigerant vapor that condenses on the surfaces of the plates 27 of the second heat exchanger 16. Simultaneously, the heat of condensation is removed from the second heat exchanger 16 by the circulation of the first heat exchange fluid between the second heat exchange conduit 34 of the second heat exchanger 16 and the radiator 24 (note action arrows G) where that heat is rejected to the environment by ambient air (note action arrow H) through the radiator 24.

As further illustrated in FIG. 3, in this DC mode of operation, the second heat exchange fluid is circulated by the third pump 42 to the core 26 and the second PCM vessel 29 (note action arrows J). More specifically, the frozen phase change material in the second PCM vessel 29 cools the second heat exchange fluid, which is then delivered to the core 26. At the core 26, the blower 35 pushes air (note action arrows D) through the core 26 in thermal communication with the second heat exchange fluid thereby cooling the air, which is then delivered to the cabin C of the vehicle. As will be appreciated, this allows the uninterrupted delivery of cold air to the cabin while the first heat exchanger 14 is regenerated to be ready for the next AE mode of the operation cycle. In one embodiment, the air-conditioning system 10 cycles between operating modes every 3 to 20 minutes with the time range being adjusted based on various demand profiles for cooling the cabin and to maximize the frozen phase change material fraction. By maximizing the frozen phase change material fraction, it is possible to maximize the vehicle parking time with the "instant cold" availability at the next vehicle start. Of course, it will also be appreciated that the "instant cold" availability time may be extended by increasing the amount of the phase change material held in the second PCM vessel 29, using a phase change material type of a higher latent heat, and/or improving the vessel insulation.

A conduit and valve system includes eight valves that may be referred to as first, second, third, fourth, fifth, sixth, seventh, and eighth valves 50, 52, 54, 56, 58, 60, 62, and 64, respectively. The conduit and valve system is configured to control the flow of the three heat exchange fluids as the air-conditioning system 10 cycles through the AE and DC modes of operation. The first valve 50 is provided at the inlet end of the first heat exchange conduit 32 while the second valve 52 is provided at the outlet end of the first heat exchange conduit 32. The third valve 54 is provided at the inlet end of the second heat exchange conduit 34 while the fourth valve 56 is provided at the outlet end of the second heat exchange conduit 34. The fifth valve 58 is provided upstream of the core 26 while the sixth valve 60 is provided downstream of the second PCM vessel 29. Finally, the seventh valve 62 is provided upstream of the radiator 24 while the eighth valve 64 is provided downstream of the radiator 24. The seventh valve 62 and the eighth valve 64 are configured to control flow of the first heat exchange fluid to or through the first PCM vessel 28 and/or the radiator 24. As described above, the first PCM vessel 28 may be utilized before the radiator 24 such that the first heat exchange fluid follows the path indicated by action arrows K. Once the first PCM vessel 28 has been "filled," then the seventh valve 62 and the eighth valve 64 can direct the first heat exchange fluid to the radiator 24 for cooling. Accordingly, the radiator 24 may not be utilized if a given trip with the vehicle is sufficiently short such that the first PCM vessel 28 is not filled. Therefore, the energy associated with operating the radiator 24 and/or an associated radiator fan may be saved. It is contemplated that in some examples only one of the seventh valve 62 and the eighth valve 64 may be utilized. For example, the seventh valve 62 may be utilized while the eighth valve 64 is omitted. Alternatively, the eighth valve 64 may be utilized while the seventh valve is omitted.

Figure 4:
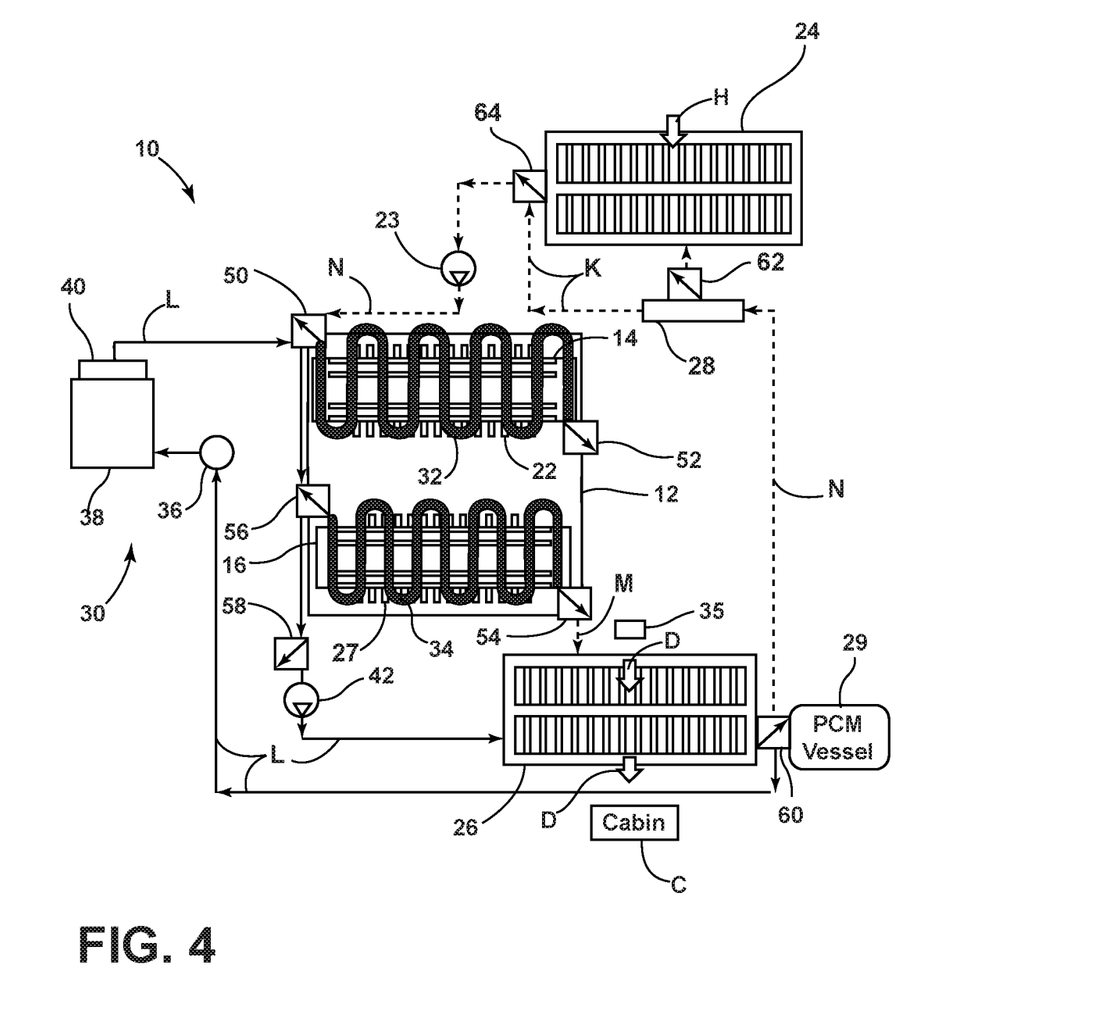
FIG. 4 is a schematic block diagram of the air-conditioning system illustrating a heating mode of operation.

Referring now to FIG. 4, in addition to the core 26 cooling the cabin C of the vehicle, the core 26 may also be utilized to increase the temperature of the cabin C during a heating mode of operation. During the heating mode, heat produced during adsorption may be utilized for heating the core 26. In such instances, the air moved by the blower 35 could be directed through the heated core 26 before it enters the cabin C in order to raise the air temperature to the level of comfort desired by the occupants. In some instances, a single core 26 may be used for both heating and cooling the cabin C. In other examples, the core 26 may include two separate components that are operably coupled with the first and/or second heat exchangers 14, 16 to separately cool and heat the cabin C based on the demands of the occupant.

Referring further to FIG. 4, the heat recovery circuit 30 may be additionally and selectively (e.g., with a valve) plumbed to the second heat exchanger 16 and/or the core 26 (see action arrows L and M) such that the heat recovery circuit 30 may provide the second heat exchange fluid and/or the third heat exchange fluid to the second heat exchanger 16 and/or the core 26. Accordingly, the core 26 then becomes a heater core rather than an air-conditioning core. When the core 26 is being operated as a heater core, the second PCM vessel 29 may be bypassed. The bypass of the second PCM vessel 29 may be accomplished, for example, by providing an additional valve between the core 26 and the second PCM vessel 29 or by alternatively positioning the sixth valve 60 between the second PCM vessel 29 and the core 26 rather than downstream of both the core 26 and the second PCM vessel 29. When the core 26 is being utilized as a heater core, the second heat exchanger 16 and/or the core 26 may be upstream of the first PCM vessel 28 and/or the radiator 24 such that an "instant heat" feature is available to occupants of the vehicle. The third PCM vessel 40 may be provided with sufficient insulation to retain the heat stored therein for the "next start" (typically about 24 hours) of the vehicle to provide the instant heat feature. If the core 26 is exceeding a pre-determined temperature, then the second and/or third heat exchange fluid may be directed to the first PCM vessel 28 and/or the radiator 24 to provide some cooling of the second and/or third heat exchange fluid prior to returning to the heat recovery circuit 30 (see action arrows N and K). Directing the second and/or third heat exchange fluid to the first PCM vessel 28 and/or the radiator 24 may be controlled, for example, by a thermostat. It is contemplated that in some environments, it may be difficult to provide adequate insulation to retain the heat stored in the third PCM vessel 40 for the next start of the vehicle. In such examples, it may be beneficial to provide a supplemental heat source (e.g., an electric heater) or some other source of heat that may be utilized immediately upon start-up of the vehicle to heat the second and/or third heat exchange fluid until the heat recovery circuit 30 has stored a minimum operating amount of heat (e.g., after about 30 seconds). At such a point, the supplemental heat source may be disengaged, bypassed, and/or flowed-through such that the heating mode operates as described above.

In summary, numerous benefits are provided by the air-conditioning system 10. As will be appreciated, the radiator 24 effectively replaces the air-conditioning condenser used in a conventional compressor-driven vehicle air-conditioning system while the core 26 effectively replaces the conventional evaporator. This eliminates AC accessory loads produced by conventional compressor-driven AC systems thereby increasing engine power and fuel economy. Additionally, by storing heat in the phase change material of the third PCM vessel 40 and cold in the phase change material of the second PCM vessel 29, the air-conditioning system 10 provides instant heating or cooling as desired to remotely precondition the air in the passenger cabin C prior to engine start. Further, by providing the first PCM vessel 28, additional energy savings may be provided for instances where the first PCM vessel 28 may be utilized to the exclusion of the utilization of the radiator 24.

The air-conditioning system 10 functions to provide a simple and efficient method for vehicle climate control that may be broadly described as including the steps of circulating a first heat exchange fluid through the radiator 24 and the first heat exchanger 14 of the vacuum enclosure 12 as well as circulating a second heat exchange fluid through the second heat exchanger 16 (in the same vacuum enclosure 12), the core 26, and the second PCM vessel 29 during the AE mode of operation. In contrast, in DC mode of operation, the method includes circulating the first heat exchange fluid through the radiator 24 and the second heat exchanger 16 as well as circulating the second heat exchange fluid through the core 26 and the second PCM vessel 29.

The method further includes circulating a third heat exchange fluid from the heat recovery circuit 30 through the first heat exchanger 14 of the vacuum enclosure 12 in the DC mode of operation in order to heat the refrigerant 18 and desorb that which adsorbed to the first heat exchanger 14 during the AE, mode. As described, the third heat exchange fluid is continuously circulated through the exhaust gas heat exchanger 38 and the third PCM vessel 40 by means of the second pump 36 in order to store heat in the phase change material within the third PCM vessel 40.

As also previously described, the method includes circulating air to be conditioned through the core 26 in thermal communication with the second heat exchange fluid. Advantageously, the air-conditioning system 10 has only a single pair of heat exchangers, such as the first heat exchanger 14 and the second heat exchanger 16, which provides a substantial weight and space savings over alternative adsorber-based air-conditioning systems that include multiple adsorber sections (e.g., typically two pairs of heat exchangers). As also disclosed, the air-conditioning system 10 includes only a single vacuum enclosure 12 wherein the first heat exchanger 14 is open to the second heat exchanger 16 so as to always operate at a high efficiency. As a result, the air-conditioning system 10 can more efficiently and effectively cool the cabin C of the vehicle for the occupants of the vehicle while simultaneously allowing the vehicle to be operated with greater fuel economy.

The air-conditioning system 10 of the present disclosure may be utilized in a variety of vehicles. The vehicles may include, but are not limited to, motor vehicles, wheeled motor vehicles, internal combustion engine vehicles, hybrid-electric vehicles, plug-in hybrid-electric vehicles, battery electric vehicles, and the like. In aspects of the foregoing disclosure, the first, second, and third heat exchange fluids may each be a different fluid. Alternatively, the first, second, and third heat exchange fluids may be the same such that a single type of heat exchange fluid is utilized in the air-conditioning system 10 (e.g., glycol). In some embodiments, two of the first, second, and third heat exchange fluids may be the same while the remaining heat exchange fluid is different.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An air-conditioning system, comprising:
   a first PCM vessel;
   a second PCM vessel;
   a heat recovery circuit comprising a third PCM vessel; and
   a conduit and valve system that operably couples:
   i. a first heat exchanger to the first PCM vessel and a radiator,
   ii. a second heat exchanger to a core and the second PCM vessel, and
   iii. the heat recovery circuit to the first heat exchanger, wherein the conduit and valve system comprises a first valve, a second valve, a third valve, a fourth valve, a fifth valve, a sixth valve, a seventh valve, and an eighth valve, and wherein the seventh valve is downstream of the first PCM vessel and upstream of the radiator and the eighth valve is downstream of the first PCM vessel, downstream of the radiator, and upstream of a first pump.

2. The air-conditioning system of claim 1, wherein the first heat exchanger and the second heat exchanger are housed within a vacuum enclosure.

3. The air-conditioning system of claim 2, wherein the first heat exchanger comprises:
   an adsorption bed for adsorbing a vapor of a refrigerant; and
   a first heat exchange conduit that circulates a first heat exchange fluid through the adsorption bed during a first mode of operation.

4. The air-conditioning system of claim 3, wherein the adsorption bed comprises:
   a plurality of plates that are coated with a desiccant.

5. The air-conditioning system of claim 4, wherein the first heat exchange conduit comprises:
   an inlet end having the first valve; and
   an outlet end having the second valve.

6. The air-conditioning system of claim 5, wherein the second heat exchanger comprises:
   a refrigerant evaporator/condenser; and
   a second heat exchange conduit that circulates a second heat exchange fluid through the evaporator/condenser during a first mode of operation.

7. The air-conditioning system of claim 6, wherein the second heat exchange conduit comprises:
   an inlet having the third valve; and
   an outlet having the fourth valve.

8. The air-conditioning system of claim 7, wherein the fifth valve is upstream of the core and the sixth valve is downstream of the second PCM vessel.

9. The air-conditioning system of claim 8, further comprising:
   a first pump positioned between the radiator and the vacuum enclosure; and
   a second pump positioned between the fifth valve and the core.

10. The air-conditioning system of claim 1, wherein the first heat exchange fluid bypasses the radiator by being directed through the first PCM vessel by the seventh and eighth valves until the first PCM vessel is filled, and wherein when the first PCM vessel is filled, the first heat exchange fluid is directed through the radiator by the seventh and eighth valves.

11. The air-conditioning system of claim 10, wherein the air-conditioning system is installed in a vehicle.

12. The air-conditioning system of claim 9, wherein the heat recovery circuit further comprises:
    a heat source;
    a third pump; and
    a third heat exchange fluid that is circulated through the heat source to capture heat.

13. The air-conditioning system of claim 12, wherein the conduit and valve system circulates the third heat exchange fluid from the heat recovery circuit through the first heat exchange conduit during a second mode of operation such that the refrigerant is heated and induces desorption at the adsorption bed.

14. An air-conditioning system, comprising:
    a first PCM vessel;
    a second PCM vessel;
    a heat recovery circuit comprising a third PCM vessel that is configured to store heat; and a conduit and valve system that operably couples:
    i. a first heat exchanger to the first PCM vessel and a radiator, wherein a first heat exchange fluid is cooled by at least one of the first PCM vessel and the radiator, and wherein a valve is positioned downstream of the first PCM vessel and upstream of the radiator, wherein the valve directs the first heat exchange fluid to the radiator when the valve is in a first open position, and wherein the valve diverts the first heat exchange fluid to bypass the radiator when the valve is in a second open position,
    ii. a second heat exchanger to a core and the second PCM vessel, which together are configured to cool a second heat exchange fluid such that the core provides cooled air, and
    iii. the heat recovery circuit to the first heat exchanger.

15. The air-conditioning system of claim 14, further comprising:
    a separate valve positioned downstream of the first PCM vessel, downstream of the radiator, and upstream of a first pump.

16. A method of operating an air-conditioning system, comprising the steps of:
    circulating a first heat exchange fluid through a first heat exchanger, a first PCM vessel, and a valve during a first mode of operation, the valve being positioned between the first PCM vessel and a radiator;
    diverting the first heat exchange fluid to bypass the radiator by adjusting the valve from a first open position to a second open position;
    circulating a second heat exchange fluid through a second heat exchanger, a core, and a second PCM vessel during the first mode of operation;
    circulating the first heat exchange fluid through the first PCM vessel during a second mode of operation; and circulating a third heat exchange fluid through a heat recovery circuit that comprises a third PCM vessel during the second mode of operation.

17. The method of operating an air-conditioning system of claim 16, wherein the step of circulating a first heat exchange fluid through a first heat exchanger and a first PCM vessel during a first mode of operation, further comprises the step of:
  circulating the first heat exchange fluid through the radiator once the first PCM vessel has been filled by adjusting the valve from the second open position to the first open position.

18. The method of operating an air-conditioning system of claim 16, wherein the step of: circulating the first heat exchange fluid through the first PCM vessel during a second mode of operation, further comprises the step of: circulating the first heat exchange fluid through the radiator once the first PCM vessel has been filled by adjusting the valve from the second open position to the first open position.

19. The method of operating an air-conditioning system of claim 16, further comprising the step of:
  circulating air to be conditioned through the core during the first mode of operation and the second mode of operation.

20. The method of operating an air-conditioning system of claim 16, further comprising the step of:
  circulating the third heat exchange fluid from the heat recovery circuit through the first heat exchanger during the second mode such that the first heat exchanger and the second heat exchanger are regenerated.

* * * * *